No. 888,075. PATENTED MAY 19, 1908.
J. W. ESHNAUR.
FISHING ROD.
APPLICATION FILED JUNE 8, 1907.
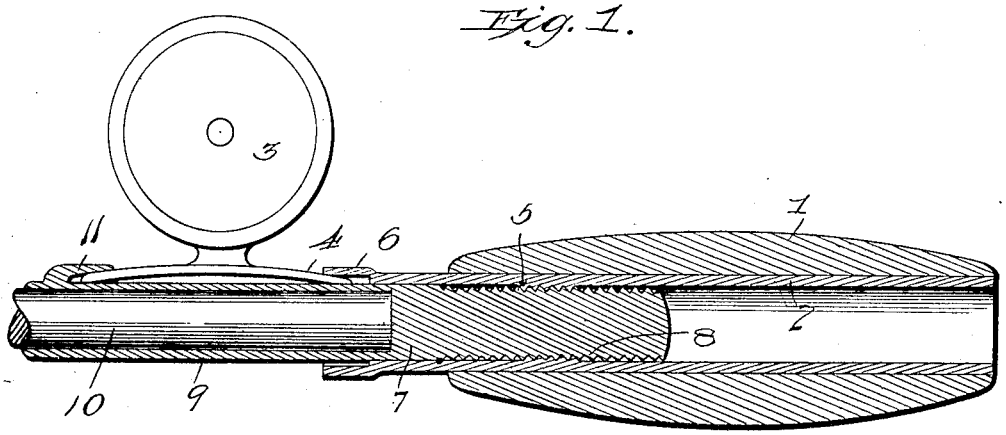
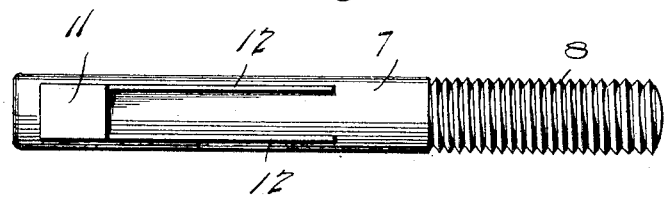

UNITED STATES PATENT OFFICE.

JEAN W. ESHNAUR, OF LOS ANGELES, CALIFORNIA.

FISHING-ROD.

No. 888,075.  Specification of Letters Patent.  Patented May 19, 1908.

Application filed June 8, 1907. Serial No. 377,903.

*To all whom it may concern:*

Be it known that I, JEAN W. ESHNAUR, a citizen of the United States, residing at Los Angeles, in the county of Los Angeles and State of California, have invented new and useful Improvements in Fishing - Rods, of which the following is a specification.

My invention relates to fishing rods and more particularly to means for attaching the reel thereto.

The object of the invention is to provide a simple, readily operated and absolutely reliable means for attaching the reel to the rod.

Heretofore it has been the practice to attach reels to rods by means of a sliding collar slipped over the reel base, or else by complicated and clumsy screw-threaded devices, the one being unreliable as it is apt to slip when strain is put upon it and the other being difficult to manipulate.

To illustrate my invention reference is had to the accompanying drawings forming part of this specification and in which—

Figure 1 is a central, longitudinal section through the butt of my improved rod, and, Fig. 2 is a plan view of one of the parts thereof hereinafter described.

Referring to the drawings in detail, 1 designates the usual handle, inside of which is fitted a sleeve or tube 2. This sleeve is bored smooth for the greater part of its length, but is provided at 5 with internally-projecting screw threads which render the bore of the tube smaller at this point than throughout the rest of its length. The outer end of the tube 2 terminates in a flange or collar 6 of enlarged diameter. Inside of the tube 2 is adapted to fit snugly a member 7 screw-threaded and solid at its rear end 8, but hollow at its outer end 9 so as to form a pocket for the reception of the rod proper 10.

Formed on one side of the member 7 as clearly shown in Fig. 2 is a pair of parallel ribs 12 connected at their outer ends by a keeper 11, the keeper and ribs thus forming a pocket into which one end of the base plate 4 of the reel 3 is adapted to fit. The member 7 at its smooth part is of substantially the same diameter as the interior bore of the tube 3 and fits snugly therein, while the threaded portion 8 takes in the projecting threads 5 on said tube.

In assembling the parts, the reel base is first slipped into the pocket formed by the keeper 11 and then the end 8 of the member 7 is inserted in the tube 2 and the handle turned so as to cause the flange 6 to travel forward and engage the other end of the base of the reel, as clearly shown in Fig. 1. The ribs 12 prevent lateral displacement of the reel base.

It will be seen that by this construction a very firm grip can be had on the reel base preventing any possibility of accidental slipping, while at the same time the construction admits of very ready removal of the reel when desired. The arrangement is light and compact and it is thought will recommend itself to those skilled in the art.

What I claim is—

A fishing rod comprising a handle, an internally threaded tube secured therein and projecting from one end thereof and having its projecting end terminating in a collar, a rod holding member having its outer end tubular and provided externally with a pair of longitudinally disposed spaced ribs and with an under-cut keeper and having its inner end solid and provided with threads to engage those of the tube, the keeper, ribs and collar coöperating with each other to provide a reel retaining means.

In testimony whereof, I affix my signature in presence of two witnesses.

JEAN W ESHNAUR.

Witnesses:
 O. C. ABBOTT,
 JESSIE E. WEAVER.